(12) United States Patent
Harel et al.

(10) Patent No.: US 11,162,607 B2
(45) Date of Patent: Nov. 2, 2021

(54) SYSTEM AND METHOD FOR PREVENTING OVER PRESSURE IN FLEXIBLE BLADDER TANKS

(71) Applicants: Alex Harel, Savion (IL); Ohad Zecharia, Shomrat Kibuts (IL); Shalom Green, Haifa (IL)

(72) Inventors: Alex Harel, Savion (IL); Ohad Zecharia, Shomrat Kibuts (IL); Shalom Green, Haifa (IL)

( * ) Notice: Subject to any disclaimer, the term of this patent is extended or adjusted under 35 U.S.C. 154(b) by 66 days.

(21) Appl. No.: 16/800,565

(22) Filed: Feb. 25, 2020

(65) Prior Publication Data
US 2020/0284375 A1  Sep. 10, 2020

(51) Int. Cl.
*F16K 31/18* (2006.01)
*B65D 90/04* (2006.01)

(52) U.S. Cl.
CPC ............ *F16K 31/18* (2013.01); *B65D 90/046* (2013.01); *Y10T 137/7728* (2015.04); *Y10T 137/86187* (2015.04); *Y10T 137/86228* (2015.04)

(58) Field of Classification Search
CPC ..... Y10T 137/86228; Y10T 137/86187; Y10T 137/7728; F16K 31/18; B65D 2590/046
See application file for complete search history.

(56) References Cited

U.S. PATENT DOCUMENTS

| | | | | | |
|---|---|---|---|---|---|
| 1,035,999 | A | * | 8/1912 | Paterson | F16K 17/42 137/399 |
| 1,080,547 | A | * | 12/1913 | Gamble | F02M 1/00 137/423 |
| 1,202,050 | A | * | 10/1916 | Gamble | E03F 1/006 137/205 |
| 1,531,808 | A | * | 3/1925 | Parkinson | E03C 1/044 210/181 |
| 2,238,108 | A | * | 4/1941 | Gates | F24F 6/04 126/351.1 |
| 2,508,170 | A | * | 5/1950 | Kaufmann | G01N 11/08 137/89 |
| 2,583,062 | A | * | 1/1952 | Riboud | B65D 90/30 220/722 |
| 3,256,908 | A | * | 6/1966 | Mann | F04B 43/1136 137/571 |
| 3,490,482 | A | * | 1/1970 | Sachs | G03D 3/06 137/205 |
| 3,739,810 | A | * | 6/1973 | Horan, Jr. | E03B 5/04 137/565.34 |
| 4,304,526 | A | * | 12/1981 | Shetler, Sr. | F04B 49/022 417/38 |
| 4,509,659 | A | * | 4/1985 | Cloutier | B67D 7/743 137/571 |

(Continued)

*Primary Examiner* — Umashankar Venkatesan

(57) ABSTRACT

A system for preventing over pressure in a flexible tank when connected to a water grid that includes the flexible tank and a control unit. An inlet of the tank is connected to the water grid through the control unit. The control unit includes a closed box, an inlet that is connected to the water grid, an outlet that is connected to the inlet of the tank, and a float valve. The user place the flexible tank and set the float so that it will be opened or closed in a certain height of activating water level in the control unit and to place the control unit in a way that the activating water level is at the same level of a desired water level of the flexible tank.

2 Claims, 2 Drawing Sheets

(56) References Cited

U.S. PATENT DOCUMENTS

| | | | | |
|---|---|---|---|---|
| 4,519,418 A * | 5/1985 | Fowler | ............... | E03B 11/00 |
| | | | | 137/565.34 |
| 4,962,789 A * | 10/1990 | Benscoter | ............... | E03B 11/02 |
| | | | | 137/357 |
| 6,098,213 A * | 8/2000 | Chu | ............... | E03B 1/042 |
| | | | | 4/597 |
| 7,080,662 B1 * | 7/2006 | Pratt | ............... | E03B 1/04 |
| | | | | 137/565.34 |

* cited by examiner

SYSTEM AND METHOD FOR PREVENTING OVER PRESSURE IN FLEXIBLE BLADDER TANKS

TECHNICAL FIELD

The present invention refers to system and method for preventing over pressure in flexible bladder tanks that includes a control unit.

BACKGROUND ART

When a flexible bladder tank is connected to a water grid (water supply network), the pressure in the water grid would explode the flexible bladder tank if the water will keep running into it when it is full. There is a need for a solution that will prevent the explosion of the flexible bladder tank. It is also important that the water in the flexible bladder tank be fresh water and not standing water, means that the water should flow through the flexible bladder tank regularly from time to time and therefore the flexible bladder tank must be regularly connected to the water grid. However, flexible bladder tank cannot stand the pressure of the water grid, which is about 4 to 6 atmospheres, because that such pressure would blow up the flexible bladder tank.

Flexible bladder tanks are known in the market and basically they are made of a tough layer, such as PVC or PVC combined with other plastic materials, and sometimes with an inner layer that meets the standards for use with drinking water. The present invention refers to any kind of flexible bladder tanks. When the flexible tank is empty, it is in a deflated condition and is therefore easy to store and handle. The flexible bladder tank is equipped with a filling and emptying spouts through which the tank is filled with water and through which the water is consumed.

The present invention discloses a system and method for using a flexible bladder tank as a storage water tank that is connected regularly to the water grid and as a result contains fresh water at any time.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

The main objective of the present invention is to provide a system and a method for preventing over pressure in a flexible bladder tank while it is connected to the water grid or another high pressure water source, by using a control unit.

Figure 1:
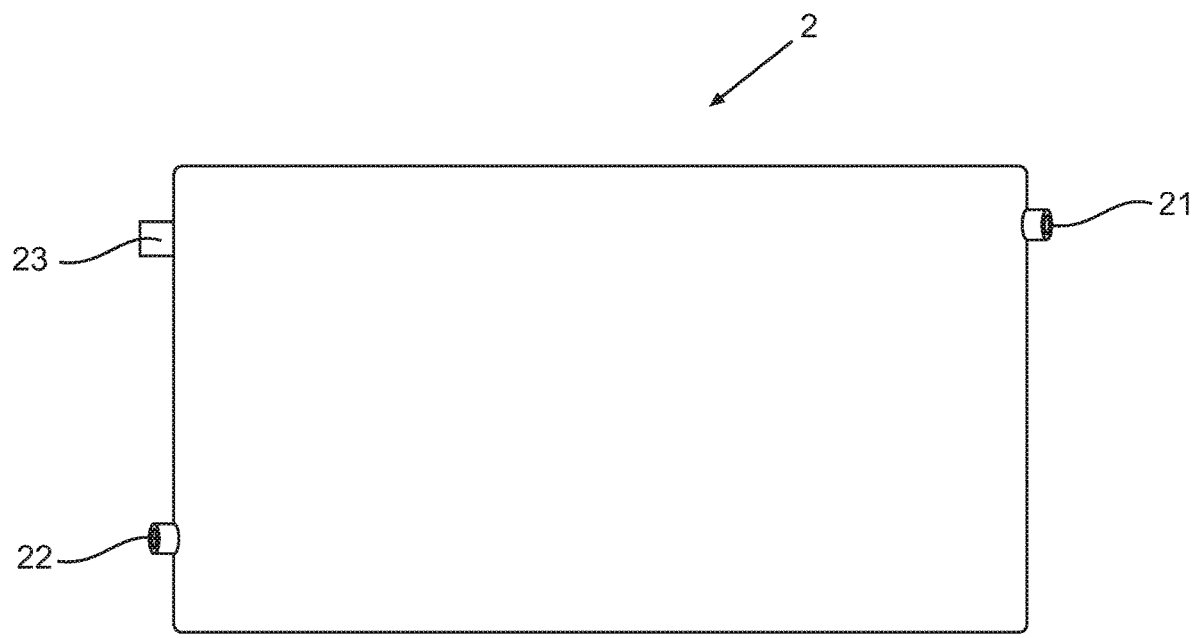
FIG. 1 schematically depicts the flexible bladder tank (2).

The system (1) includes a flexible bladder tank (2) and a control unit (3). The flexible bladder tank (2) includes an inlet opening (21) that is designed to be connected to the water grid (100) through the control unit (3), and an outlet opening (22). The outlet opening (22) may be designed to be connected to a structure pipe (200) through which water flows from the water grid (100) to the a structure and/or to include a spigot (23) that enables a user to consume water directly from the flexible bladder tank (2). FIG. 1 depicts schematically the flexible bladder tank (2).

Figure 2:
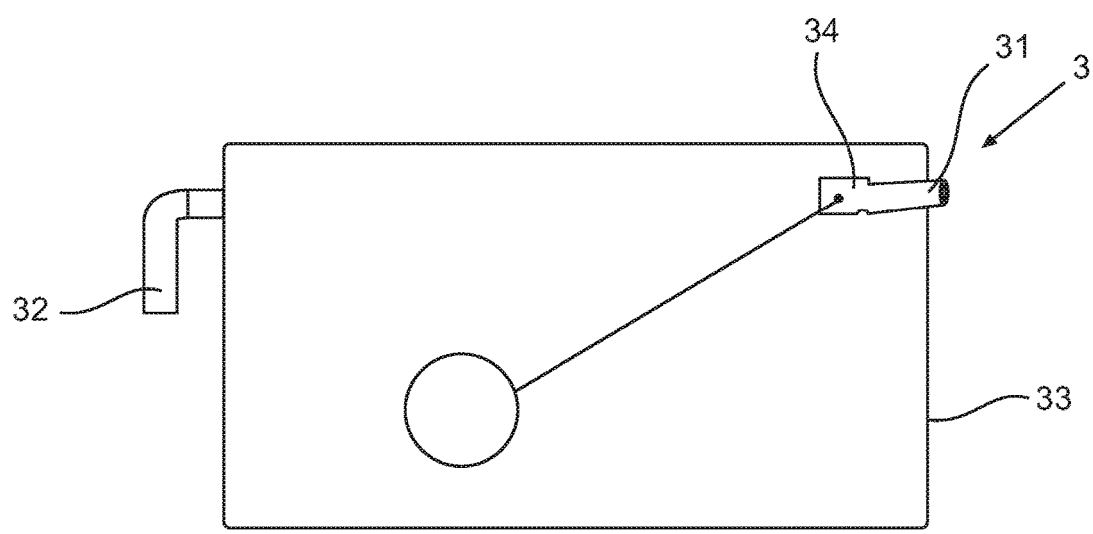
FIG. 2 schematically depicts the control unit (3).

The control unit (3) comprises a closed box (33), an inlet opening (31) that is designed to be connected to the water grid (100), an outlet opening (32) that is designed to be connected to the inlet opening (21) of the flexible bladder tank (2), and a water float valve mechanism (33). FIG. 2 depicts schematically the control unit (3).

Figure 3:
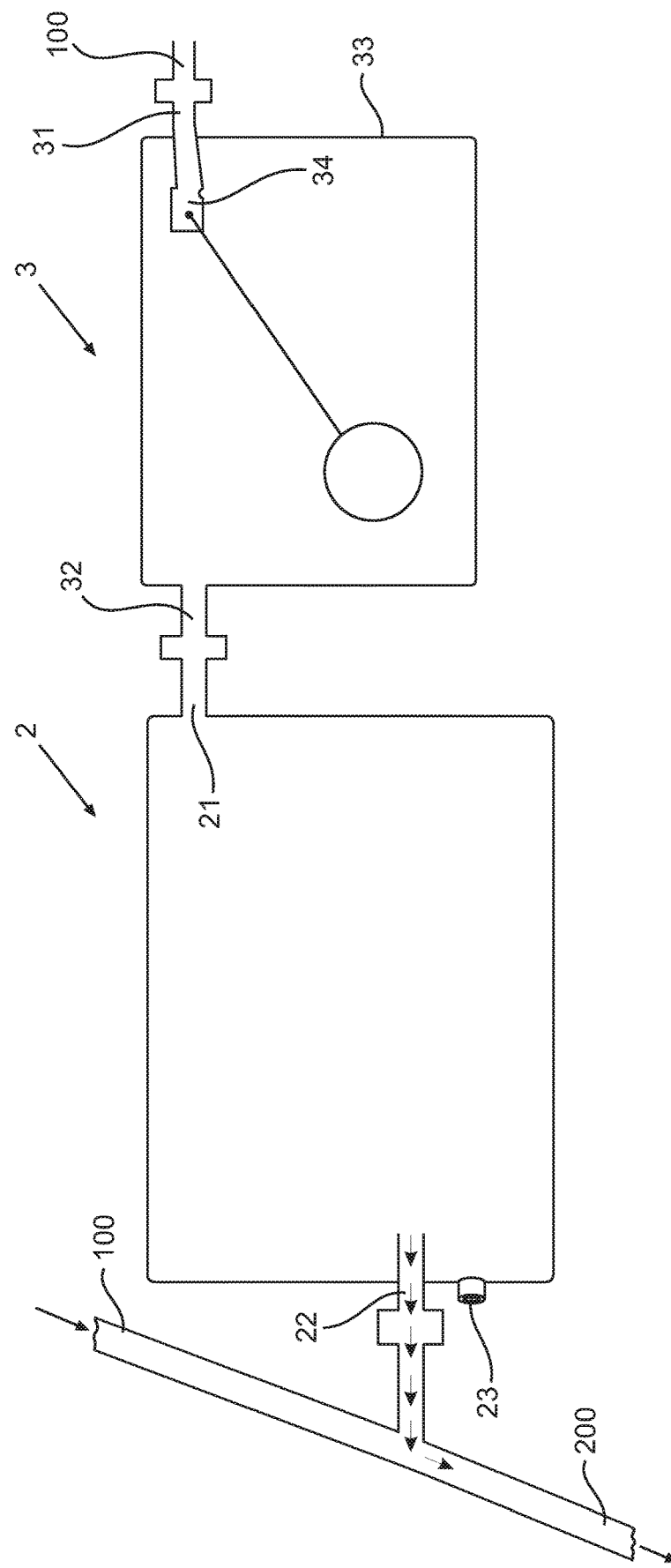
FIG. 3 schematically depicts the system (1).

Connecting the system (1) to the water grid (100) and for example to the structure pipe (200) is illustrated in FIG. 3 in which: (a) the inlet opening (31) of the control unit (3) is connected to the water grid (100); (b) the outlet opening (32) of the control unit (3) is connected to the inlet opening (21) of the flexible bladder tank (2); (c) the outlet opening (22) of the flexible bladder tank (2) is connected to the structure pipe (200).

Installing the System (1):
First step: Determining the desired height of the water level in the flexible bladder tank (hereinafter "the desired water level") that simply may reflects the level when the tank is full or almost full for better safety.
Second step: Placing the flexible bladder tank (2) where it is intended to be when in use.
Third step: Setting the water float mechanism (34) so that it will be activated, opened or closed, in a certain height of water level in the control unit (3) (hereinafter "the activating water level") and placing the control unit (3) where it is intended to be when in use, in a way that the activated water level is at same level of the desired water level of the flexible bladder tank.

The Manner in which the System (1) Works:
After installation of the system (1) the water flows from the water grid (100) into the control unit (3) and from there to the flexible bladder tank (2).

When the water in the flexible bladder tank (2) arrives the desired water level then water level in the control unit (3) reach the activating water level, according to the communicating vessels principle, and the water float valve mechanism (34) is closed and prevent water to continue to flow from water grid (100) to the control unit (3) and from there to the flexible bladder tank (2).

When the user consume water from the flexible bladder tank (2) the water level in the flexible bladder tank (2) drops and the same in the control unit (3) and due to that the water float valve mechanism (34) is opened, and so forth.

In case that the outlet opening (22) of the flexible bladder tank (2) is connected to the structure pipe (200) through which water flows from the water grid (100) to the structure then when water flows from the water grid (100) through the structure pipe (200) then water from the flexible bladder tank (2) is sucked out into the structure pipe (200), according to the Venturi effect. Consequently, the water level in the flexible tank (2) drops and the same in the control unit (3) and due to that the water float valve mechanism (34) is opened, and so forth.

Users usually use water at least several times a day and as a result of that at least every couple of hours a small amount of water flows out of the flexible bladder tank (2) either to the structure pipe (200) or through the spigot (23) and the same amount of water flows into the flexible bladder tank (2) and consequently keeps the freshness of the water inside it at any given moment.

It is possible to summarize the system and the method as follows:

A system for preventing over pressure in a flexible bladder tank while it is connected to a water grid, comprising said flexible bladder tank (2) and a control unit (3);

wherein said flexible bladder tank (2) includes an inlet opening (21) that is designed to be connected to the water grid (100) through said control unit (3), and an outlet opening (22) that can be connected to a spigot (23) or to a structure pipe (200);

wherein said control unit (3) comprises a closed box (33), an inlet opening (31) that is designed to be connected to the water grid (100), an outlet opening (32) that is designed to be connected to the inlet opening of the flexible bladder tank (2), and a water float valve mechanism (33);

whereby a user can place the flexible bladder tank (2) where it is intended to be when in use;

whereby enabling the user to set the water float mechanism (34) so that it will be opened or closed in a certain height of activating water level in the control unit (3) and to place the control unit (3) where it is intended to be when in use, in a way that said activating water level is at the same level of a desired water level of the flexible bladder tank;

whereby enabling the water to flow from the water grid (100) into the control unit (3) and from there to the flexible bladder tank (2);

whereby enabling the water in the flexible bladder tank (2) to reach the desired water level and the water in the control unit (3) to reach the activating water level, and enabling the water float valve mechanism (34) to be closes and prevent water to continue to flow from the water grid into the control unit and from there to the flexible bladder tank (2); and whereby when water flows outside from the flexible bladder tank (2) then the water level in the flexible bladder tank (2) and in the control unit (3) drops and the water float valve mechanism (34) is opened, and so forth.

A method for preventing over pressure in a flexible bladder tank while it is connected to a water grid, comprising:

(a) providing a flexible bladder tank (2) and a control unit (3), wherein said flexible bladder tank (2) includes an inlet opening (21) that is designed to be connected to the water grid (100) through said control unit (3), and an outlet opening (22) that can be connected to a spigot (23) or to a structure pipe (200); wherein said control unit (3) comprises a closed box (33), an inlet opening (31) that is designed to be connected to the water grid (100), an outlet opening (32) that is designed to be connected to the inlet opening of the flexible bladder tank (2), and a water float valve mechanism (33);

(b) placing the flexible bladder tank (2) where it is intended to be when in use;

(c) setting the water float mechanism (34) so that it will be opened or closed in a certain height of activating water level in the control unit (3) and placing the control unit (3) where it is intended to be when in use, in a way that said activating water level is at the same level of a desired water level of the flexible bladder tank;

whereby enabling the water to flow from the water grid (100) into the control unit (3) and from there to the flexible bladder tank (2);

whereby enabling the water in the flexible bladder tank (2) to reach the desired water level and the water in the control unit (3) to reach the activating water level, and enabling the water float valve mechanism (34) to be closes and prevent water to continue to flow from the water grid into the control unit and from there to the flexible bladder tank (2); and whereby when water flows outside from the flexible bladder tank (2) then the water level in the flexible bladder tank (2) and in the control unit (3) drops and the water float valve mechanism (34) is opened, and so forth.

What is claimed is:

1. A system for preventing over pressure in a flexible bladder tank while it is connected to a water grid, comprising said flexible bladder tank and a control unit;

wherein said flexible bladder tank includes an inlet opening that is designed to be connected to the water grid through said control unit, and an outlet opening that can be connected to a spigot or to a structure pipe;

wherein said control unit comprises a closed box, an inlet opening that is designed to be connected to the water grid, an outlet opening that is designed to be connected to the inlet opening of the flexible bladder tank, and a water float valve mechanism;

whereby a user can place the flexible bladder tank where it is intended to be when in use;

whereby enabling the user to set the water float mechanism so that it will be opened or closed in a certain height of activating water level in the control unit and to place the control unit where it is intended to be when in use, in a way that said activating water level is at the same level of a desired water level of the flexible bladder tank;

whereby enabling the water to flow from the water grid into the control unit and from there to the flexible bladder tank;

whereby enabling the water in the flexible bladder tank to reach the desired water level and the water in the control unit to reach the activating water level, and enabling the water float valve mechanism to be closed and prevent water to continue to flow from the water grid into the control unit and from there to the flexible bladder tank; and whereby when water flows outside from the flexible bladder tank then the water level in the flexible bladder tank and in the control unit drops and the water float valve mechanism is opened.

2. A method for preventing over pressure in a flexible bladder lank while it is connected to a water grid, comprising:

(a) providing a flexible bladder tank and a control unit, wherein said flexible bladder tank includes an inlet opening that is designed to be connected to the water grid through said control unit, and an outlet opening that can be connected to a spigot or to a structure pipe; wherein said control unit comprises a closed box, an inlet opening that is designed to be connected to the water grid, an outlet opening that is designed to be connected to the inlet opening of the flexible bladder tank, and a water float valve mechanism;

(b) placing the flexible bladder tank where it is intended to be when in use;

(c) setting the water float mechanism so that it will be opened or closed in a certain height of activating water level in the control unit and placing the control unit where it is intended to be when in use, in a way that said activating water level is at the same level of a desired water level of the flexible bladder tank;

whereby enabling the water to flow from the water grid into the control unit and from there to the flexible bladder tank;

whereby enabling the water in the flexible bladder tank to reach the desired water level and the water in the control unit to reach the activating water level, and enabling the water float valve mechanism to be closed and prevent water to continue to flow from the water grid into the control unit and from there to the flexible bladder tank; and whereby when water flows outside from the flexible bladder tank then the water level in the flexible bladder tank and in the control unit drops and the water float valve mechanism is opened.

* * * * *